United States Patent

[11] 3,566,932

| [72] | Inventor | Guenther Papenmeier<br>Schulstrasse 4931 Pivetsheide V.L. Kreis,<br>Detmold, Germany |
|---|---|---|
| [21] | Appl. No. | 718,706 |
| [22] | Filed | Apr. 4, 1968 |
| [45] | Patented | Mar. 2, 1971 |

[54] PROCESS FOR RATIONAL PRODUCTION OF SIZE PLATES WITH A PLATE SAW, IN PARTICULAR USING AN ELECTRONIC CONTROL AND DEVICE FOR PRACTICING SAID PROCESS
5 Claims, 7 Drawing Figs.

[52] U.S. Cl............................................................ 143/47,
83/562
[51] Int. Cl........................................................ B27b 5/18,
B23d 45/02
[50] Field of Search.......................................... 143/47+, 1;
90/(Inquired); 83/555, 562, 483

[56] References Cited
UNITED STATES PATENTS

| 1,631,927 | 6/1927 | Dietrich ....................... | 143/47X |
| 988,038 | 3/1911 | Shipley........................ | 143/47X |
| 2,211,082 | 8/1940 | Smith ........................... | 143/47-3UX |
| 2,819,743 | 1/1958 | Birkel et al. .................. | 143/1X |

Primary Examiner—Donald R. Schran
Attorney—Pennie, Edmonds, Morton, Taylor and Adams ABSTRACT: The invention relates to a sawing machine for rational production of size plates of any dimensions by means of a plate saw, wherein, after preselection of dimensions, a series of lengthwise and crosswise cuts are made in sequential order without lost time, while saving return runs and idle cuts.

INVENTOR
Günther Papenmeier

INVENTOR
Günther Papenmeier

INVENTOR
Günther Papenmeier

PROCESS FOR RATIONAL PRODUCTION OF SIZE PLATES WITH A PLATE SAW, IN PARTICULAR USING AN ELECTRONIC CONTROL AND DEVICE FOR PRACTICING

Plate saws employing circular saws where the saw carriage is run to and fro on ways lengthwise and crosswise of the plate stock are known.

It is known further that the saw unit, consisting of a circular saw motor and blade, may be capable of swinging 90° on an axis perpendicular to the work so that the unit can execute both lengthwise and crosswise cuts in conjunction with a transverse and lengthwise support.

Also, it has heretofore been proposed specifically that in addition to the 90° swing for shifting from lengthwise to crosswise cutting, the saw unit be swung 180° at its end-of-cut positions so that the saw return time can be utilized for actual cutting. Despite utilization of the return time, actual cutting times of size saws in particular are highly unfavorable. The essential disadvantage of such plate saws consists in that, for like numbers of transverse and lengthwise cuts, the effective cutting time for a rough plate of maximum size is just the same as for smaller plate sizes. This is because the lengthwise and crosswise cuts may extend over the entire length and width of the platform. For example, in the use of an electric control, the saw carriage is run transverse to the stop up to certain contact points for the lengthwise cut, and the lengthwise cut itself is than executed by feeding the lengthwise support over the entire length of the bed. For the cross cut, the lengthwise support is advanced to the desired contact points, while the cut is made by means of the transverse support over the entire width of cut of the bed.

This means double machine time for half the plate size. While in this type of saw the return is utilized for cutting, there is much lost time in the form of idle cutting. For handling rough plates of different dimensions, machine time cannot therefore be accurately determined in advance. But economical utilization, especially for automated production, requires maximum effective cutting output with uniform output factor, regardless of differences in size and in length-to-width ratio of the rough plates.

The devices in known plate saws for swinging the saw unit have the particular disadvantage that the saw unit is held in its various positions by the rotating machine components. Proper saw guidance and accurate cutting to measure is then unavailable, since components that transmit motion have the tolerances that the motion requires. But an exact setting of the saw unit can be ensured as the only means of precise cutting action and of preventing undue blade wear.

Further, the number of traveling units is an important factor of proper saw guidance. In the known devices, there are usually a lengthwise, a transverse and a vertical support and swinging means, with tolerances for motion among them. The tolerances accumulate down to the saw blade, so that the saw unit fails to be guide accurately.

These important defects are to be remedied by the device according to the invention and perfected by the process for rational production of size plates of any dimensions to such an extent that in a very short time, with very high precision, size plates of any dimensions can be produced on one piece of equipment.

By the process according to the invention for rational production of size plates, a plate saw of any size is to be fully utilized for any rough plate dimension, in that the device automatically adjusts itself to the shape of the particular rough plate to be worked, at the same time achieving a maximum effective cutting output throughout the coordinate system.

For accurate cut guidance, the device according to the invention is provided moreover with a tolerance-free jaw stop or jig in which the saw unit rests fixed and immovable in its lowered, working position. After the cut has been executed, the saw unit is automatically lifted out of the fixed jig and shifted into the proper 90°, 180° or 270° position by electric command. Before the beginning of each cut, the saw unit drops into working position, down to the selected depth of cut, and thus seats itself accurately in the jig. The result is a positive precision setting to the 90° position in question. The setting of the saw blade is not affected by the swing, since the vertical axis is to pass through the center of the blade, and consequently only a single electronic control is required. The swing mechanism itself is independent of the jig, so that tolerances for motion in the swing mechanism are without effect on the jig, and so no fine adjustment of the swing mechanism to the various angles is required either. With use of the automatic jig, a continuous swing of the unit through 270° for example can be executed quickly and without difficulty. The desired 90° positions are obtained between the cuts themselves. To cut down the number of moving components, the swing operation about the vertical axis and the left motion are combined in one movable unit. Accordingly, the conventional vertical support can be dispensed with, thus reducing the number of parts in motion relative to each other and thereby heightening the precision in cut guidance.

The invention will now be further explained with reference to the accompanying drawing. In the drawings.

Figure 2:
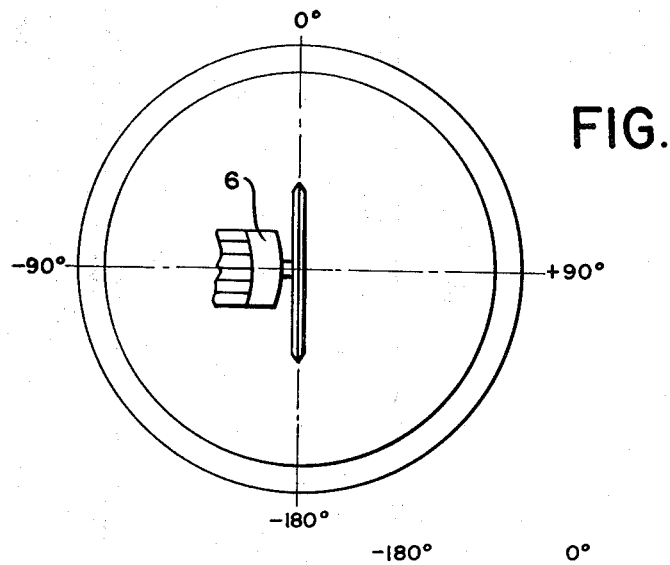
FIG. 2 shows a diagram of the swing and positions of the saw unit.

The device according to the invention for executing the cutting operation consists of a bed 1 to which laterally, in known manner, slide or roller guides are fitted, on or in which spaced lengthwise supports 3 are arranged to travel for the lengthwise cuts to be executed as well as for setting the cross cuts to gauge. The lengthwise supports 3 are equipped in known manner with a crossmember 4, which in turn bears a transversely movable support 5 for executing the cross cuts and for setting the lengthwise cuts to gauge. In the transverse support 5, a vertically movable saw unit 6, capable of swinging through at least 270°, is mounted, which before the beginning of each cut is lowered into the proper 90° stop, and after completion of each cut is lifted out of the stop. FIG. 2 shows the range of swing of the saw unit 6 in the several 90° positions and indicates the placement of the saw unit.

Figure 3:
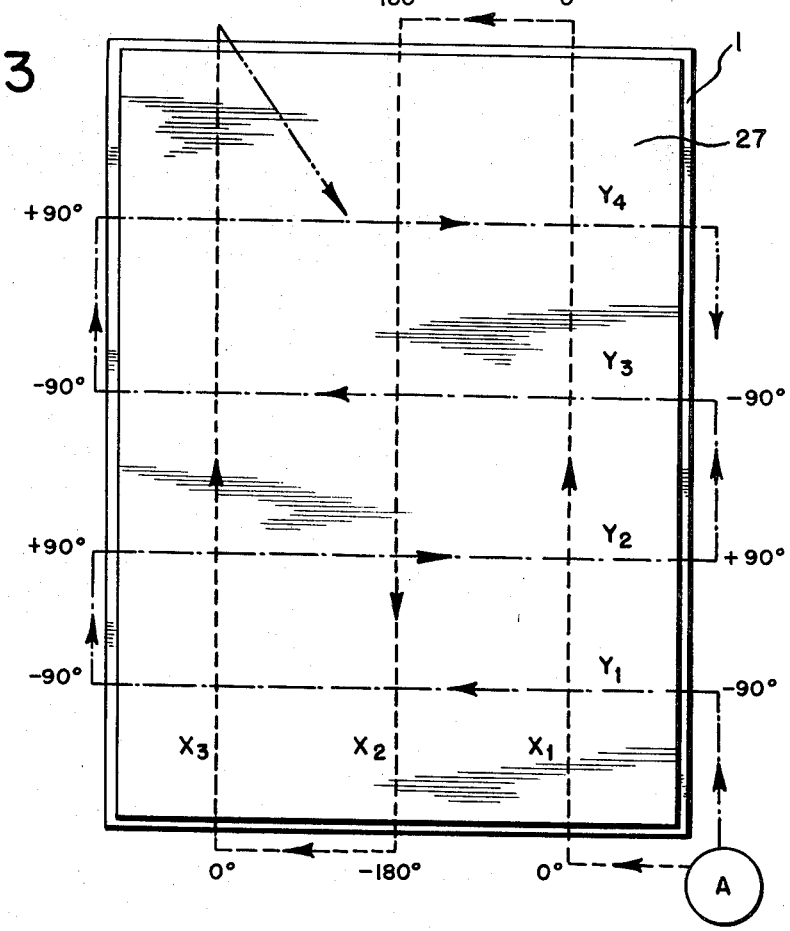
FIG. 3 shows a diagram of the cutting operation, representing a rough plate of maximum size to be cut.

FIG. 3 shows a cutting diagram on the top of a stack of plates 27, using a plate shape of maximum size. Before the cutting program, the saw unit is in the staring position A. For example, after preselection of the desired dimensions of the lengthwise cuts $x_1$, $x_2$ and $x_3$ and of the cross cuts $y_1$, $y_2$, $y_3$ and $y_4$ with a known electronic control system, the support 5 approaches the first measurement $x_1$, the saw unit being in 0° position. Before beginning the cut, the saw unit drops to the set depth of cut and is automatically locked tolerance-free in that position. After completion of cut $x_1$, the unit lifts out of the cut, while at the same time the stop or jig is released.

The transverse support 5 approaches the next measurement for cut $x_2$, the unit at the same time swinging into −180° position. The sawing unit drops back to cutting depth, at the same time being locked into position of swing, and executes cut $x_2$. After completion of this cut, the lifting and unlocking of the unit and the swing to 0° for the next lengthwise cut $x_3$ are repeatedly as previously described. After completion of the lengthwise cuts $x$, the saw unit returns to the starting position A to execute the preselected cross cuts $y_1$, $y_2$, $y_3$ and $y_4$.

For this purpose, for the first cut $y_1$ the unit swings to −90° position, the lengthwise supports 3 being traveled into the position of the first cut $y_1$.

When this cut has been executed, the unit swings to +90° position for cut $x_2$, drops back to cutting depth, and executes the cuts, in the same manner as previously described for the lengthwise cuts.

Figure 4:
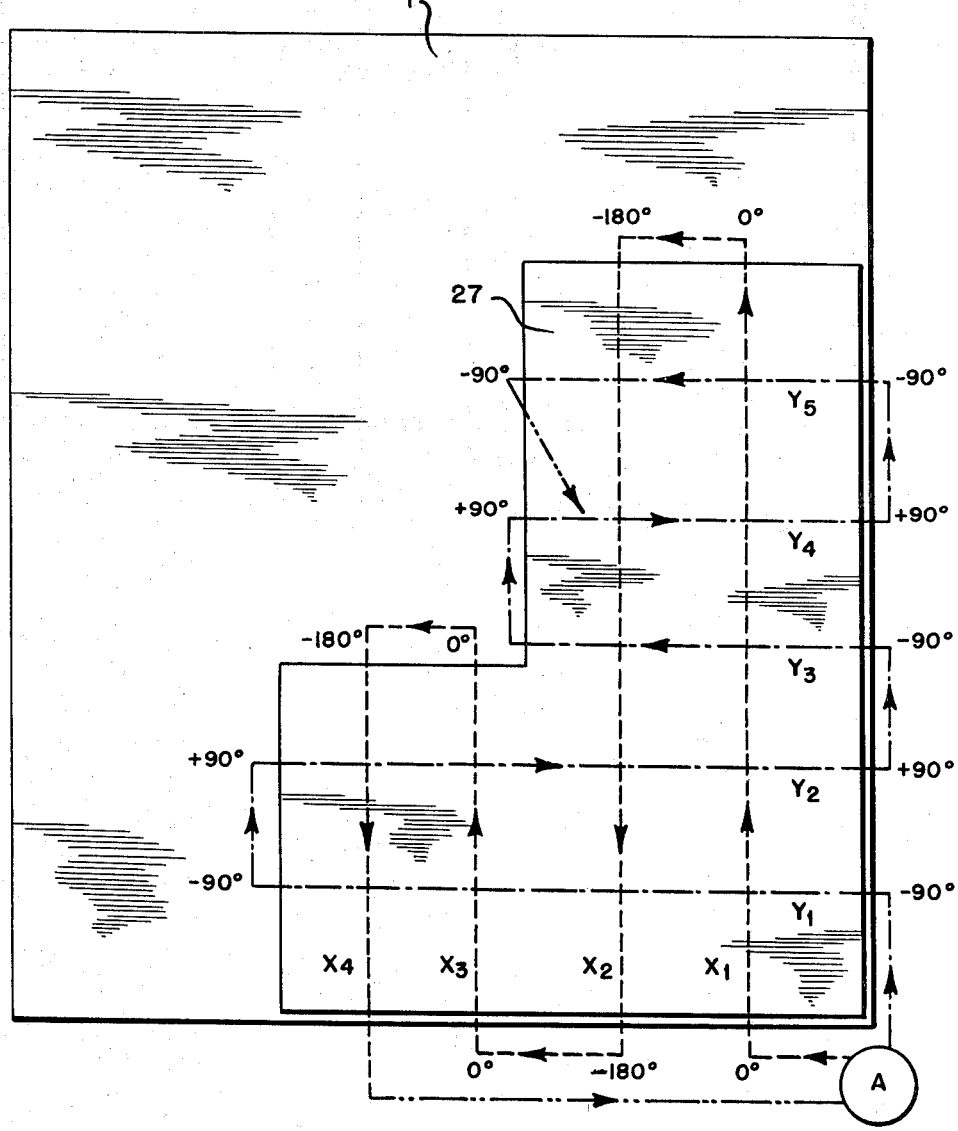
FIG. 4 shows a diagram of the cutting operation in working on rough plates of smaller dimensions.

FIG. 4 illustrates the cutting operation in which the sequence of cuts, the starting point and the stopping point are determined according to the shape and dimensions of the rough plate to be cut, and compared to the rough plate of maximum size, relatively unchanged cutting times are achieved. Thus only is it now made possible to use large-size plate saws for smaller plate sizes economically and efficiently and for the production of single parts as well.

For illustration, FIG. 4 represents the cutting of a rough plate with stepwise dimensions, to show an example of the rational application of the cutting process according to the invention in the case of single parts particularly.

The saw unit is in starting position A. Lengthwise cuts $x_1$ and $x_2$ are executed tin the same manner as previously described in detail with reference to FIG. 3, with the difference that the length of cut does not extend over the entire length of the platform 1, but only as far as the edge of the stock, at which point the lifting and swinging operations for the return cut are initiated immediately. For the following lengthwise cuts $x_3$ and $x_4$, the turnarounds occur earlier still, thus avoiding any idle cuts on the part of the saw. The following cross cuts $y_1$ and $y_2$ as well as the shorter cuts $y_3$ and $y_4$ proceed in the same manner as the previous lengthwise cuts. By this method, it is possible for plate saws for large sizes to be used efficiently to handle any rough plate dimensions, while achieving a maximum effective cutting output.

To practice this process, a feeler is attached for example to the saw unit to scan the rough plates and, after limiting the plates, interrupt the operation then in progress and release the control for the next scheduled program.

Figure 5:
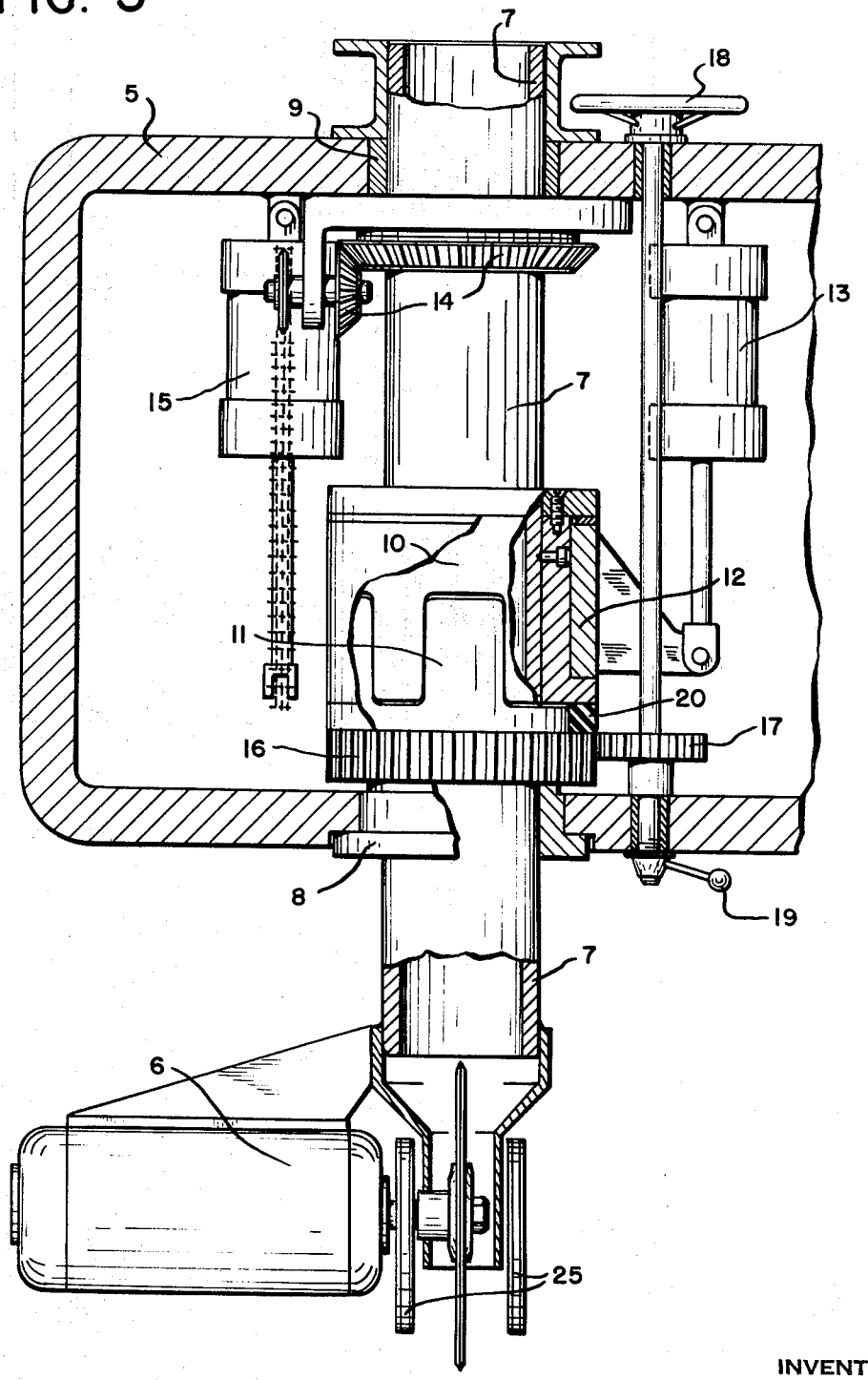
FIG. 5 shows a cross section of the jig and lifting means of the saw unit, with pneumatic cylinders.

Fig. 5 shows a view in partial section of the transverse support 5 accommodating the lift and swing system for the saw unit 6. The saw unit 6 is mounted on a preferably hollow shaft 7, mounted radially and axially displaceable in guides 8 and 9. A jaw clutch 10 is fixedly connected to the hollow shaft 7, matching a lock or jig 11. The jig 11 forms a unit with the bushing 8. The jaw clutch 10 is encircled by a ring 12 capable of being lifted by means of one or more air cylinders 13. This lifts the hollow shaft 7 with jaw clutch 10 out of the jig 11, and then it can be swung about the vertical axis into the several 90° positions, for example by means of bevel gearing 14 with the aid of air cylinders 15, using any desired mechanical transmission means. When the desired cutting position has been reached, air pistons 13 lower shaft 7 back into cutting position, while the jaw clutch 10 at the same time meshes with the jig 11 and fixes the saw unit 6 in the new position. The cutting depth limitation can be adjusted with a nut 16 screwed onto bushing 8. The nut 16 can be screwed up and down with the handwheel 18 by way of a pinion 17. This vertical adjustment may for example be fixed to advantage by means of a safety 19. The engagement of the jaw coupling 10 in the lock or jig 11 may be cushioned if desired by means of an elastic interlay 20.

Figure 6:
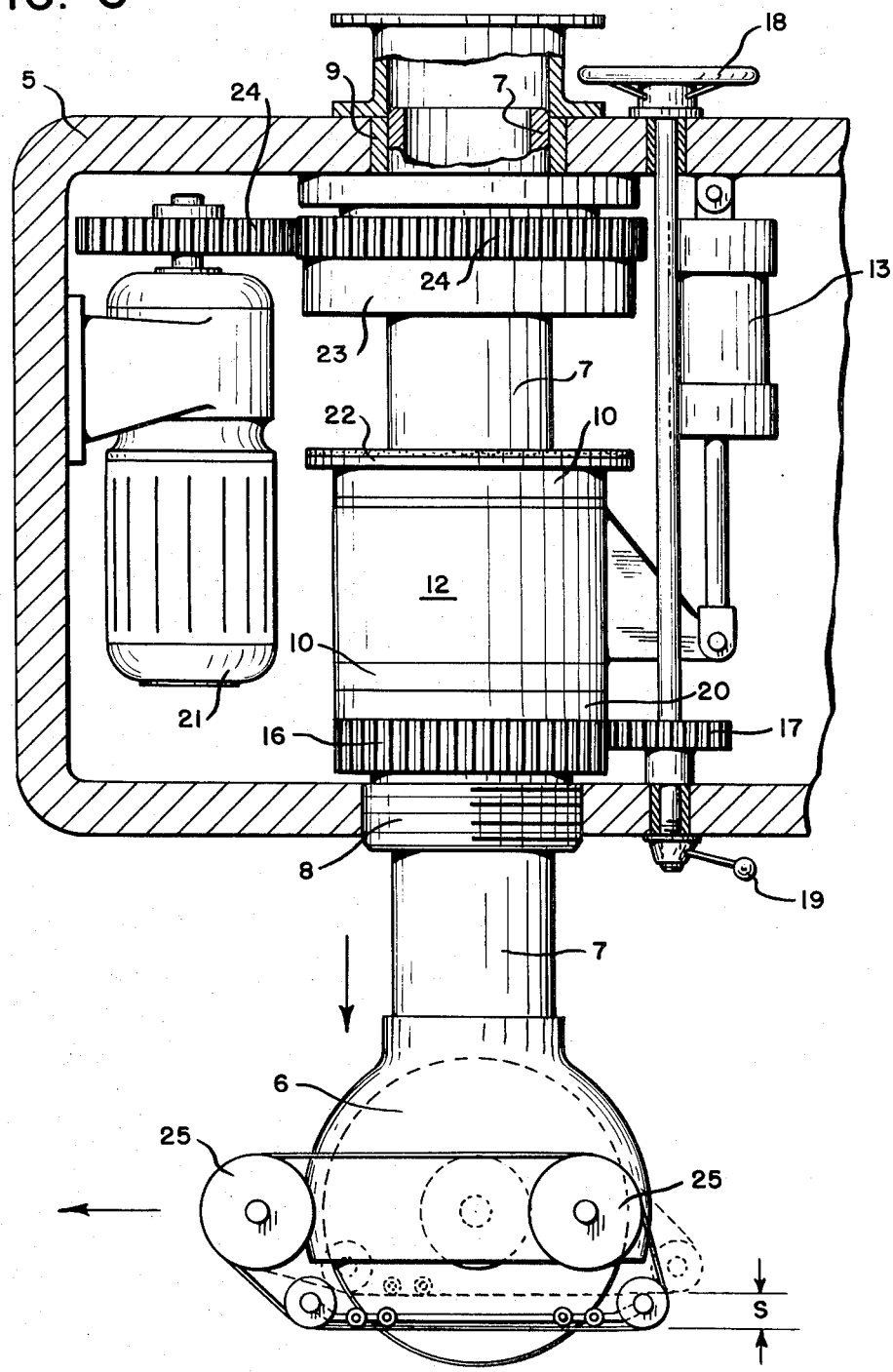
FIG. 6 shows a cross section of the device according to the invention with pneumatically operated jaw jig and swing mechanism with motor gear reducer, in operating position lowered to cutting depth.
Figure 7:
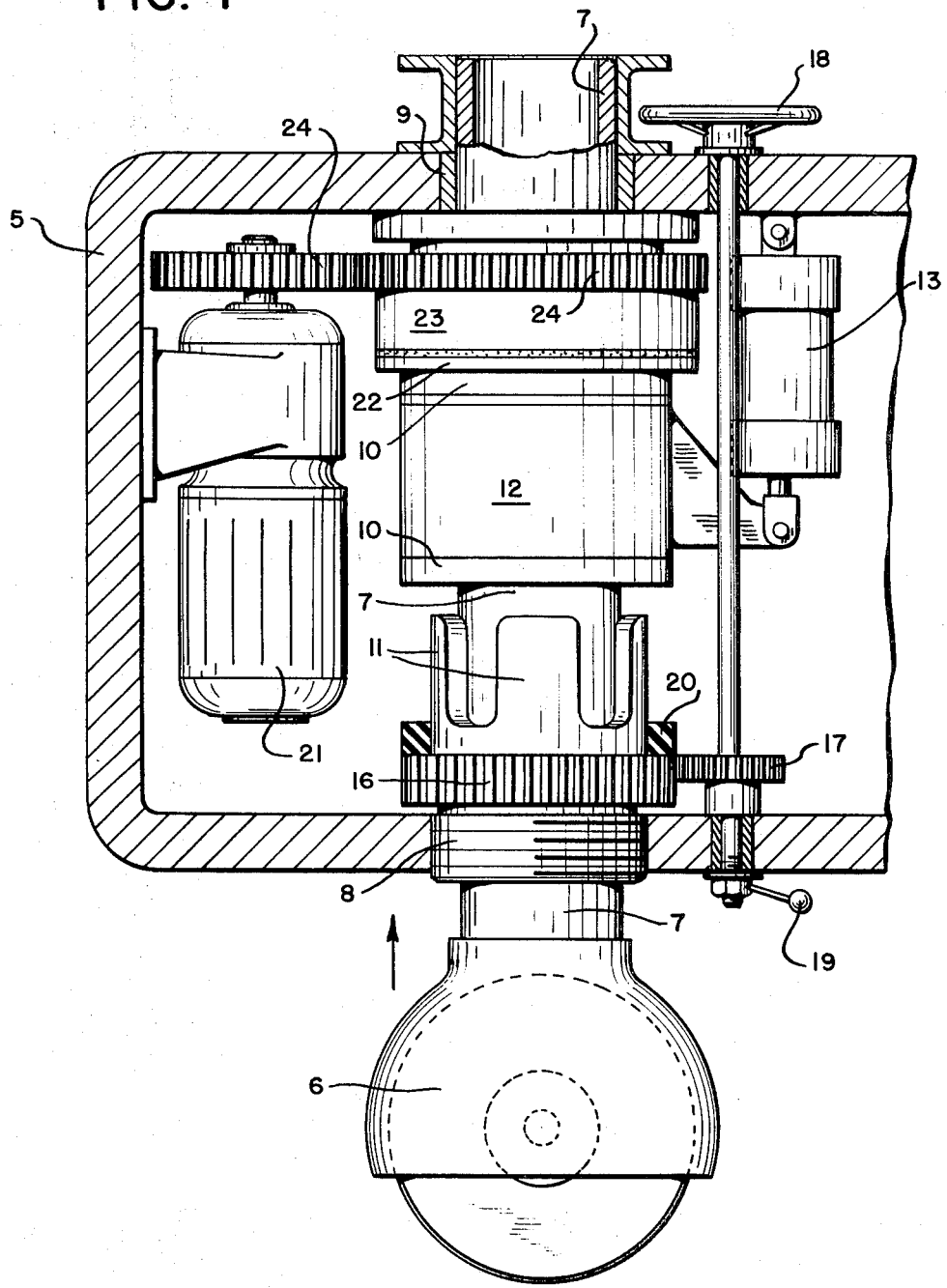
FIG. 7 shows a cross section like FIG. 5, but in raised swing position.

FIG. 6 shows a further proposal. The shaft 7 is likewise lifted by one or more air cylinders 13 while the swing operation is executed by a motor gear reducer 21. The lifting of the jaw chuck 10 out of the jig 11 lifts the shaft 7 enough so that the clutch disc 22 in contact is held against the rotating matching disc 23. This turning operation is represented in FIG. 7. The air cylinder 13 has already elevated the hollow shaft 7 with saw unit 6. The air cylinder 13 has withdrawn the hollow shaft with jaw clutch 10 out of the jig 11. Shaft 7 is thus unlocked, and it can be swung on the vertical axis. The clutch disc 22 presses against the matching disc 23 driven by the motor gear reducer 21 by way of gear teeth 24. This rotates the hollow shaft 7 with saw unit 6. As soon as the preselected setting has been reached, the air cylinder 13 allows the unit 6 to drop down to cutting depth, while at the same time the clutch 22 is released from the rotating disc 23, and the rotation is interrupted. Here, any precision control of the swing mechanism can be dispensed with because the jaw clutch 10 always slips into the fixed jig. By contrast to the embodiment of FIG. 5, the shaft bearing 8 is not flanged to the housing 5, but screwed in. By actuating hand wheel 18, pinion 17 can be made to rotate the screwed in bushing 8, provided with teeth 16, whereby the limitation of stroke can be adjusted for the cutting depth. Besides, at each 90° rotation, a fine readjustment of the saw cut can be carried out. When the cutting depth has been set and the direction of cut adjusted, this setting can be fixed with a safety 19.

For working position, the saw unit 6 is lowered directly in front of the edge of the material, the rough plates to be cut being compressed by the plate clamps 25, arranged on the left and right alongside the saw blade, before the blade enters the material. The plate clamps 25 have a spring travel $s$ for different thicknesses of material, the track bearing down on the plates being capable of shifting parallel only, up or down. This avoids the possibility that with half contact, for example at the edge of the stock, the clamps 25 may tilt and shift the plates. The plate holders are constructed in known manner of a plurality of sheaves with traveling V-belts.

Since the saw unit 6 of the sawing apparatus according to the invention is lowered directly in front of the edge of the stock before the cut begins, the rough plate parts are not shifted. This eliminates the need for any special clamping means, such as tongs, holddowns or the like.

Figure 1:
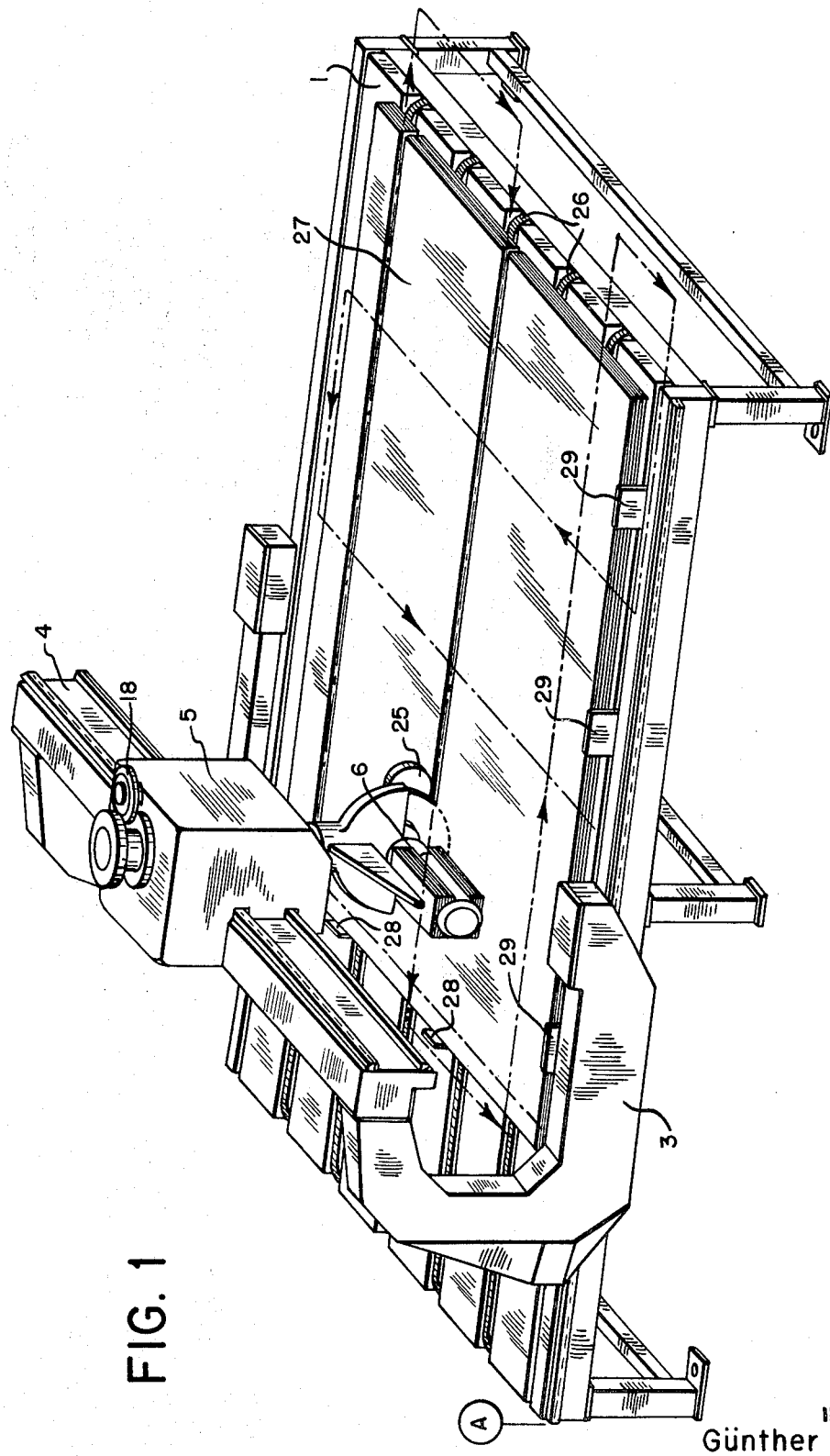
FIG. 1 shows a pictorial view of the device according to the invention.

For putting the device according to the invention into operation, the stack of rough plates 27 is carried for example by retractable conveyor belts 26, FIG. 1, from a preceding feed table not shown against front stops 28. Then, the stack of rough plates is straightened out lengthwise by additional lateral stops 29, actuable by mechanisms of any kind transverse to the platform 1. When the stack of rough plates 27 has been set down and lined up, the cutting program begins, the plates 27 being held firm by the clamps 25.

I claim:

1. An automatic sawing machine for the production of shaped sections of predetermined dimensions from rough plates and the like sheet material, comprising a platform having longitudinal and transverse dimensions for supporting the sheet material to be sawed, a crossmember above the platform having spaced supports respectively at the longitudinal sides of the platform and movable longitudinally along the platform, a transversely movable support carried by the crossmember for movement across the platform, a vertically movable shaft carried by the transversely movable support, a vertically movable saw unit mounted on and rotatably fixed with respect to said shaft, means in the transversely movable support for raising and lowering the shaft and the saw unit carried thereby and for rotating the shaft about its axis when in raised position, and means for automatically stopping and locating the saw unit at a predetermined angular position with respect to the platform when the saw unit is in its lowered working position.

2. A sawing machine as claimed in claim 1, wherein the stopping means includes a jig connected with respect to said transversely movable support and provided with recesses at 90° intervals.

3. A sawing machine as claimed in claim 2, wherein the recesses of the stopping jig are oriented to provide for saw cuts parallel to and at 90° with respect to the longitudinal sides of the platform.

4. A sawing machine as claimed in claim 2, wherein the shaft carries a jaw coupling extending therearound and provided with projections adapted to fit in and accurately engage the recesses in the stopping jig.

5. A sawing machine as claimed in claim 2, wherein the stopping jig is adjustable vertically with respect to the transversely movable support for in turn adjusting the vertical position of the saw unit, and plate clamps provided with longitudinal belts adapted to engage the plate being sawed, said plate clamps being located respectively on opposite sides of the saw unit and including a pressure loaded parallelogram structure biasing the belts against the plate being sawed.